Nov. 23, 1965 J. N. DUPREE 3,218,906
CAPTIVE SCREW AND WASHER ASSEMBLY
Filed June 18, 1962
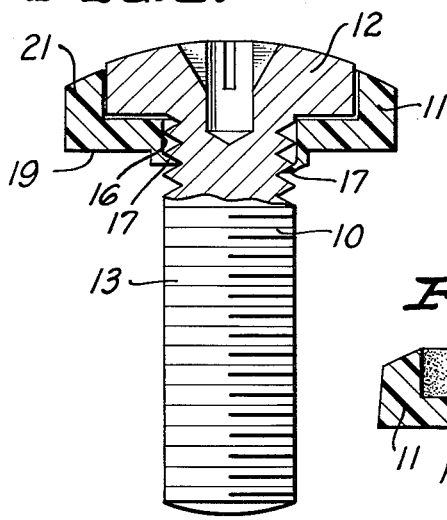
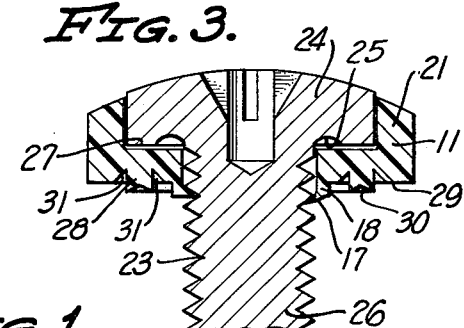
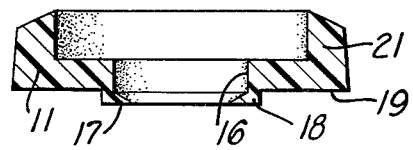
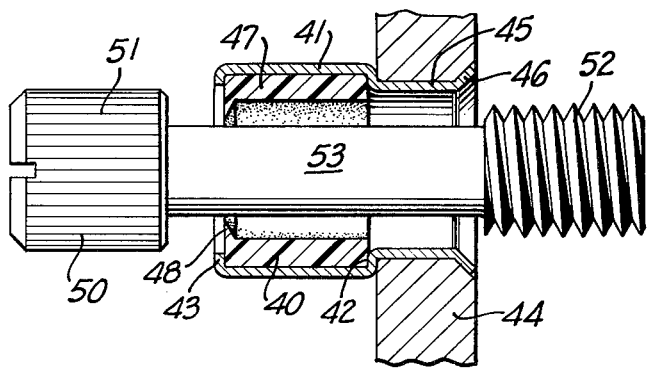
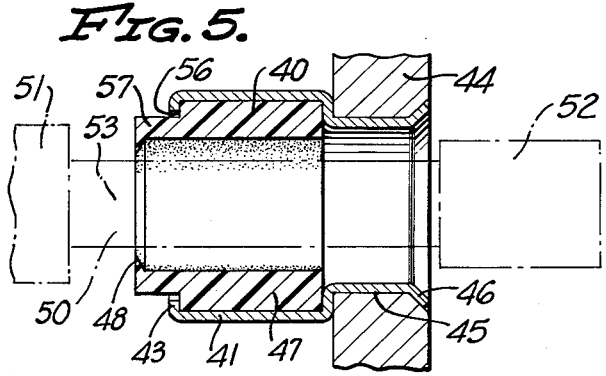
INVENTOR
JAMES N. DUPREE
BY HIS ATTORNEYS
HARRIS, KIECH, RUSSELL & KERN United States Patent Office 3,218,906
Patented Nov. 23, 1965

3,218,906
CAPTIVE SCREW AND WASHER ASSEMBLY
James N. Dupree, West Covina, Calif.
(1710 N. Potrero St., South El Monte, Calif.)
Filed June 18, 1962, Ser. No. 203,327
2 Claims. (Cl. 85—50)

This invention relates to captive screw and washer assemblies and, in particular, to new and improved units which are simpler and less expensive than presently used devices while providing new and superior results.

Washers have been used in conjunction with screws for many purposes. Washers are small and difficult to handle and are often dropped and lost and various forms of screw and washer combinations have been utilized in the past. Because screws are used in large quantities, even small savings in cost and time per unit represent substantial over-all savings. Accordingly, it is an object of the present invention to provide a new and improved captive screw and washer assembly which is simple, inexpensive and easy to manufacture and assemble. A particular object is to provide such a unit which may use standard screws without requiring any modification or special machine work thereon.

It is an object to provide a captive screw and washer assembly which has an attractive and appealing appearance, one which protects the elements being fastened from marring by screwdriver blades and the like, one which is vibration resistant and which provides a moisture seal.

It is an object of the invention to provide a captive screw and washer assembly which can be produced in the form of a free screw and washer and in the form of a panel-mounted or fixed screw and washer. A particular object is to provide a washer for use with a screw having a threaded shaft and a head to form a captive screw and washer assembly with the washer being formed of a resilient material and including a tubular portion defining a passage for receiving a portion of a screw and including a circumferential flange projecting into the passage for engaging the thread of the screw and impeding axial movement of the screw.

These and other objects, advantages, features and results of the invention will more fully appear in the course of the following description. The drawing merely shows and the description merely describes preferred embodiments of the present invention which are given by way of illustration or example.

In the drawing:

FIG. 1 is a sectional view of a preferred form of the washer of the invention;

FIG. 2 is a sectional view of the washer of FIG. 1 in combination with a screw;

FIG. 3 is a sectional view similar to that of FIG. 2 showing an alternative form of the invention;

FIG. 4 is a sectional view showing a panel-mounted embodiment of the captive screw and washer assembly; and FIG. 5 is a sectional view showing an alternative form of the structure of FIG. 4.

The embodiment of FIGS. 1 and 2 includes a screw 10 and a washer 11. The screw 10 is preferably of standard design and construction having a head 12 and a threaded shaft 13 with the threads extending all the way to the head. Certain prior art captive screw and washer units have utilized screws with several threads removed adjacent the head but such an arrangement is not necessary with the assembly of the present invention.

The washer 11 is made of a resilient material such as rubber or nylon and preferably is molded in the desired form. The washer includes a screw shaft receiving passage 16 and a circumferential flange 17 projecting into the passage 16. The passage 16 is dimensioned so that the threaded portion of the screw freely slides therein. The flange 17 is preferably tapered as shown in FIG. 1 and has an inner diameter less than the outside diameter of the threaded portion of the screw, preferably being less than the pitch diameter of the screw. In the preferred form shown in FIG. 1, the flange 17 is carried on an annular boss 18 projecting from the face 19 of the washer. The opening receiving the screw may be of a size to snugly receive the boss 18 of the washer for centering the screw in the opening and providing electrical insulation between the screw and the element having the opening.

The washer also includes a tubular extension 21 which provides a cup for receiving the head 12 of the screw. The screw and washer are assembled as shown in FIG. 2 with the screw being pushed through the opening in the washer. The resilient flange 17 is deflected outward as the screw threads move thereby. When thusly assembled, the screw and washer form a single unit and there is no chance of the washer being lost. The screw may be rotated relative to the washer, as when the screw is being tightened in a threaded opening, with the flange 17 moving over the screw thread. Thus the desired relative rotation between screw and washer is achieved without requiring any special machine work on the screw.

An alternative form of the invention especially adapted for moisture resistant seals is shown in FIG. 3, wherein elements identical to those of FIG. 2 are identified by the same reference numerals. This embodiment is particularly adapted for use with pan and binder head screws, such as screw 23 in which the head 24 has an undercut portion 25 adjacent the threaded shaft 26 to provide an axially projecting annular portion 27 for engaging the washer 11. An annular rib 28 projects from the surface 29 of the washer and is disposed to underlie the portion 27 of the screw head. In the preferred form shown in FIG. 3, the end 30 of the rib is made concave and the rib is positioned in a concave groove in the face 29 providing undercuts 31 on each side of the rib. The volume of the projecting rib 28 is preferably equal or nearly equal to the volume of the undercuts 31, permitting complete retraction of the rib into the washer body when the screw is tightened in place.

With the embodiment of FIG. 3, tightening of the screw applies a direct compressive force on the rib 28 producing a tight moisture resistant seal. The concave areas in the rib and washer face provide an increase in sealing surface area while substantially reducing the amount of deformation occurring. This materially improves the useful life of the seal.

An alternative form of the invention for use with fixed screw and washer assemblies is shown in FIG. 4. A washer 40 is mounted in a bushing 41, as by positioning the washer against an internal shoulder 42 and spinning over a bushing end 43. The bushing is adapted for mounting in a panel or other member 44. Typically a tubular section 45 of the bushing is positioned in an opening in the panel 44 and flared outward at the end 46.

The washer 40 may be made of a resilient material such as is used for the washer 11. The washer includes a tubular portion 47 and a circumferential flange 48.

A screw 50, which may be a thumb screw with a knurled and slotted head 51, a threaded shaft 52, and an intermediate portion 53, is positioned in the bushing and washer assembly. The threaded shaft portion 52 of the screw is freely slidable in the bushing 41 and in the tubular portion 47 of the washer. The intermediate portion 53 of the screw is freely slidable past the flange 48 of the washer while the flange impedes axial movement of the threaded section 52 in the same manner as in the embodiments of FIGS. 2 and 3. The screw 50 may be made from one piece but preferably is made in two parts, one the head 51, and the other the threaded section 52 and intermediate section 53, with the two parts joined to form the complete screw.

In assembly, the washer is fixed in the bushing first, normally at the initial manufacturing location. The bushing is then fixed in the panel, after which the threaded portion of the screw is pushed past the flange of the washer to the position shown in FIG. 4. The screw may now be used to fasten the panel 44 to another member and to remove the panel 44 at will, with the screw being retained in the panel at all times.

An alternative form of the unit of FIG. 4 is shown in FIG. 5, with corresponding elements identified by the same reference numerals. The washer 40 has an external shoulder 56 engaged by the spun-over end 43 of the bushing, with a portion 57 of the washer projecting beyond the bushing. The circumferential flange 48 is preferably positioned at the end of the projecting portion 57. This structure is assembled in the same manner as the unit of FIG. 4. When the screw 50 is tightened, the screw head 51 bears against the washer compressing the end portion 57 and forcing the flange 48 into sealing engagement with the shaft 53 of the screw, thus providing a moisture and dust-resistant seal along the face of the panel 44. This structure also provides electrical insulation between the screw 50 and the panel 44.

The captive washer and screw assembly of the present invention enjoys the advantages of conventional units while being simpler and less expensive to manufacture and use. The unit has an appealing appearance and provides mechanical protection for the members being fastened. The resilient washer structure results in a vibration and shock resistant fastening and produces a seal which is highly moisture and dust resistant. The captive feature is available in both free and fixed units.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. A washer for use with a screw having a threaded shaft and an enlarged head to form a captive screw and washer assembly, said washer being formed of resilient material with a screw shaft receiving passage therethrough perpendicular to a first surface thereof and an annular flange projecting generally axially from the periphery of the opposite surface thereof defining a screw head receiving cup, said washer having an annular boss projecting axially from said first surface at said screw shaft receiving passage and carrying a generally radially extending tapered lip terminating in a circular opening and projecting into and partially closing said passage for engaging the thread of the screw positioned therein, said washer having an annular groove formed in said first surface radially outwardly from said boss and an annular rib with a concave end projecting axially from said groove, the volume of said projecting rib being substantially equal to the volume of the unfilled portion of said groove.

2. A washer for use with a screw having a threaded shaft, a head, and an axially projecting annular washer engaging surface to form a captive screw and washer assembly, said washer being integrally formed entirely of resilient material with a screw shaft receiving passage therethrough perpendicular to first and second parallel resilient surfaces thereof, said washer having an annular boss projecting from said first washer surface and carrying a generally radially extending tapered lip terminating in a circular opening and projecting into and partially closing said passage for engaging the thread of the screw positioned therein, the head being engageable with said second washer surface, said washer having an annular rib projecting axially from said first washer surface and spaced radially outwardly from said boss for sealing engagement with a screw receiving element, said annular rib having a concave end and projecting from a concave groove in said first surface with the volume of said projecting rib substantially equal to the volume of the unfilled portion of said groove.

References Cited by the Examiner

UNITED STATES PATENTS

| | | | |
|---|---|---|---|
| 2,439,516 | 4/1948 | Holcomb | 85—50 |
| 2,592,130 | 4/1952 | Erb et al. | 85—2 |
| 2,660,493 | 11/1953 | Flick | 277—168 |
| 2,761,347 | 9/1956 | McKee | 85—1 |
| 2,761,484 | 9/1956 | Sternick et al. | 151—69 |
| 2,826,231 | 3/1958 | Alden | 151—41.7 |
| 2,831,520 | 4/1958 | Clarke | 151—69 |
| 2,941,105 | 6/1960 | Rickenbach | 85—50 |
| 2,949,325 | 8/1960 | Nenzell | 85—50 |
| 2,995,057 | 8/1961 | Nenzell | 85—9 |
| 3,083,796 | 4/1963 | Bell | 151—69 |
| 3,126,935 | 3/1964 | Tuozzo | 151—41.75 |

EDWARD C. ALLEN, *Primary Examiner.*